United States Patent [19]
Zumbach et al.

[11] 3,864,625
[45] Feb. 4, 1975

[54] METHOD AND A DEVICE FOR MEASURING THE THICKNESS OF THE WALL OF A TUBE OF NON-CONDUCTING MATERIAL LEAVING AN EXTRUDER NOZZLE

[75] Inventors: Bruno Zumbach, Orpund; Peter Nopper, Lyss, both of Switzerland

[73] Assignee: Zumbach Electronic Automatic, Canton, Berne, Switzerland

[22] Filed: Dec. 12, 1972

[21] Appl. No.: 314,334

[30] Foreign Application Priority Data
Dec. 13, 1971  Switzerland.................... 18201/71

[52] U.S. Cl.......................... 324/34 TK, 324/34 E
[51] Int. Cl............................................. G01r 33/00
[58] Field of Search........... 324/34 R, 34 TK, 34 E, 324/40, 37; 11/11

[56] References Cited
UNITED STATES PATENTS
| | | | |
|---|---|---|---|
| 2,676,298 | 4/1954 | Frommer | 324/34 R |
| 2,898,550 | 8/1959 | Fischer | 324/34 TK |

FOREIGN PATENTS OR APPLICATIONS
| | | | |
|---|---|---|---|
| 157,503 | 12/1962 | U.S.S.R. | 324/34 TK |
| 631,988 | 11/1949 | Great Britain | 324/37 |

*Primary Examiner*—Robert J. Corcoran

[57] ABSTRACT

A method and apparatus for measuring the wall thickness of a tube of electrically non-conducting material such as one leaving an extruder, wherein at least one electrically conducting object is maintained inside the tube at a definite distance or space from the inner surface of the tube wall, and a measuring device scans the outer surface of the tube at a definite distance therefrom such that the distance between the measuring device and said object passes through a minimum, this minimum being measured and the tube thickness deduced therefrom.

21 Claims, 12 Drawing Figures

PATENTED FEB 4 1975

METHOD AND A DEVICE FOR MEASURING THE THICKNESS OF THE WALL OF A TUBE OF NON-CONDUCTING MATERIAL LEAVING AN EXTRUDER NOZZLE

The present invention relates to a method of measuring the wall thickness of a tube leaving an extruder, the tube being made of non-conducting material.

Measuring the wall thickness of plastics material tubes directly on leaving an extruder nozzle is fo considerable importance because the production of faulty tubes can waste considerable quantities of material. It should also be possible to ascertain directly after the extruder is taken into operation, whether the wall thickness of the tube is uniform over its whole circumference, and is of the required value. It is an object of the present invention to provide a method and device by means of which the wall thickness of tubes of nonconducting material can be reliably measured.

According to the present invention there is provided a method of measuring the wall thickness of a tube of nonconducting material such as one leaving an extruder, including the steps of locating an electrically conducting article at a definite distance or space which may be zero from the inside surface of the tube, locating a measuring device at a predetermined distance from the outer surface of the tube, measuring the distance between the said article and said device, and deducing the tube thickness from the measurement.

When measuring the thickness of the wall of a tube leaving the nozzle of an extruder, the space within the tube is not directly accessible and it is impossible to check the exact position of said electrically conducting article at the inner tube wall. Therefore, when measuring the distance between the measuring device and said article it is not sure whether the shortest possible distance is measured, this depending on whether the position of the measuring device is exactly opposite the article or not. In order to avoid this difficulty, my method includes relative displacement between the article and the measuring device in order that the mutual distance between these parts passes through a minimum. This minimum occurs when the article and the measuring device are exactly opposite each other at the inside and outside respectively of the tube wall. Therefore, the distance measured between said measuring device and said article when the minimum distance between them occurs is a correct measure for the thickness of the tube wall.

The invention is described in detail below by way of several embodiments shown in the drawings.

Figure 1:
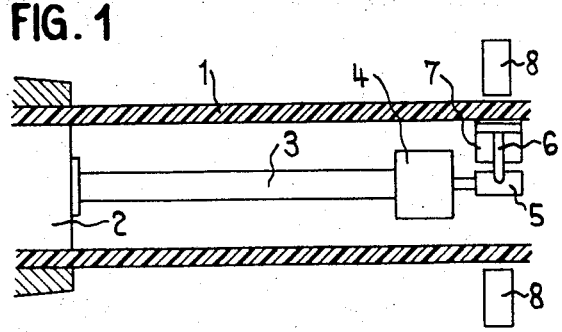
FIGS. 1 and 2 show a first embodiment in longitudinal and transverse cross-sections.

FIG. 1 shows the nozzle of an extruder, from which the plastics material tube 1 is extruded in a still plastic state. The external surface of the tube 1 has already been cooled in the the region of the nozzle, and hence shortly before leaving the nozzle has appreciable strength. A carrier 3 is secured on a mandrel 2 of the extruder nozzle. At its free end it carries a motor 4, such as a pneumatic motor. The supply and return pipes for this motor pass through the carrier 3, the mandrel 2 of the nozzle, and ribs connecting the mandrel 2 to the outer part of the nozzle. The motor 4 drives a boss 5 at a suitable speed; the boss carries an arm 6 on which is an article in the form of a flat metal spring 7 which abuts resiliently against the inside surface of the tube 1. In the region of the flat spring 7 four identical measuring devices 8 are located around the tube circumference, space 90° apart. Each measuring device is provided with a coil fed with highfrequency current, which is varied by the spring 7 when this spring is located in the region of the field of the measuring coil, this of course being due to the alteration of the impedance of the coil caused by the proximity of the metal (conducting) body.

Figure 2:
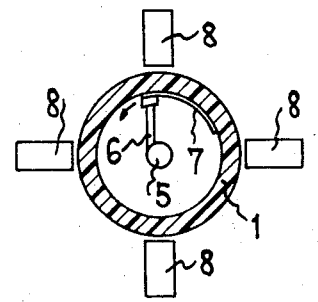

As already mentioned, the motor 4 during measurement drives the boss 5 and hence the flat spring at a suitable speed of, for example, ten revolutions per second in the direction of the arrow in FIG. 2, so that the flat spring 7 slides along the inside surface of the tube 1. During each passage of the spring 7 beneath one of the measuring devices 8 the inductance of the measuring coil of this device is altered, thus altering the current in the coil. The maximum alteration in each measuring device when acted upon by the spring 7, is indicated or recorded. Thus, not only is it possible to ascertain whether the wall thickness of the tube 1 is the same at all the four measuring points, but also whether the thickness measured has the required value. The measured results may be used to control or adjust the extruder.

The relative movement between the spring 7 and the measuring devices 8 (assumed to be fixed), has the advantage that no mutual positioning of the spring 7 and the associated measuring devices has to be predetermined. Such a condition would be difficult to fulfil, becauuse the spring located in the interior of the tube can be retained only with difficulty in a fixed position, and this position cannot be readily determined.

In the embodiment of FIGS. 1 and 2 it is assumed that the measuring devices 8 are located at a slight distance from the outer surface of the tube 1. This condition may be maintained by arranging that sliding shoes are fitted on the devices 8, which rest on the outer surface of the tube 1, or are maintained by pneumatic means at a certain spaced relationship from the tube surface. It is obvious that under these conditions the distance measured by the devices 8 as a result of the spring 7 sliding along the inside surface of the tube 1 can constitute a direct measurement of the thickness of the tube wall at the measuring points. The measurements may evaluate only variations in the wall thickness, or by calibration with a standard tube may also measure the actual wall thickness.

Figure 3:
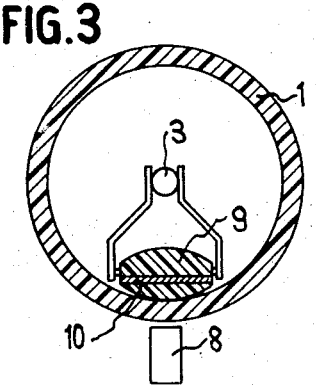
FIG. 3 shows a cross-section through a second embodiment.

In the embodiment of FIG. 3 a cask-shaped measuring body 9 made of insulating material, such as plastics material, is in rolling engagement with the inside surface of the tube 1. The body 9 is mounted in a fork which by means of a carrier 3 is suspended from the mandrel 2. A metal rod 10 eccentrically is located in the body 9 and passes through the body. During measurement the body is in rolling engagement along the inside surface of the tube 1 as emitted from the extruder. During each rotation of the body 9 the rod 10 temporarily assumes a minimum spacing from the measuring device 8. As described above in connection with FIG. 2, the measurement value corresponding to this minimum spacing can be selected, stored and indicated, thus showing the thickness of the tube wall at the measuring position. Several rollers 9 and associated measuring devices 8 may be located over the circumference of the tube 1, or the roller 9 and measuring device 8 may be pivoted into different measuring positions in order to ascertain successively the wall thickness at the points concerned. Suitable means are provided to press the roller 9 steadily against the inside surface of the tube 1.

Figure 4:
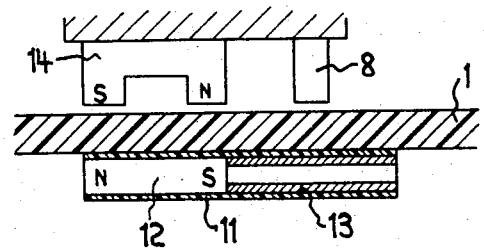
FIG. 4 shows part of a longitudinal section through an alternative embodiment.

FIG. 4 shows an embodiment in which the article acting on the measuring device 8 is magnetically retained in a required position against the tube wall. For this purpose a measuring article is laid in the interior of the extruded tube. The article includes a plastics material tube 11 with a bar magnet 12 at one end and an aluminium sleeve 13 at the other. On the outside of the tube there is a permanent or electro-magnet 14 which attracts the bar magnet 12 and retains it in the required position. In this case the measuring device 8 measures the distance to the aluminium tube 13, which distance includes the thickness of the tube wall if the measuring device 8 is retained at a definite distance from the outside surface of the tube, and if the measuring article 11, 12, 13 is located constantly along a line nearest the device 8 along the inner surface of the tube 1.

Figure 5:
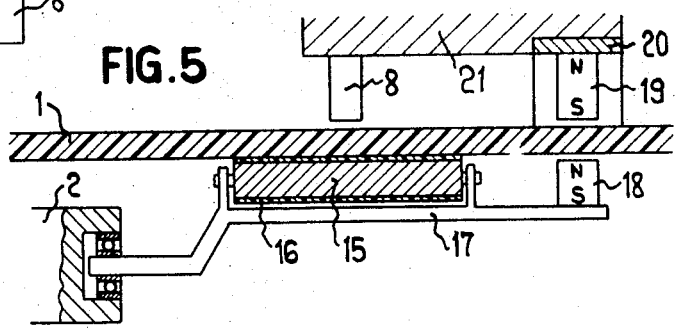
FIG. 5 shows part of a longitudinal section through a further embodiment.

FIG. 5 shows an alternative embodiment of the measuring device of FIG. 4. The difference consists in that the measuring article is a metal roller 15, which has a plastics material coating 16 to protect the inside surface of the tube 1. This roller is mounted in a holder 17 which in turn is mounted on the nozzle mandrel 2. A permanent magnet 18 opposed to a permanent magnet 19 on the outside surface of the tube 1, is located on the holder 17. The actual measuring device 8 and the associated magnet are not located as shown in FIG. 4 on a common carrier in a fixed opposite position, but the magnet 19 may be pivotally moved relative to the measuring device 8, since it is mounted on a ring 20 which is rotatable in a carrier 22 of the measuring device.

During measurement the magnet 19 retains the magnet 18 and hence the metal cylinder 15 in the required position with regard to the measuring device 8. During measurement the magnet 19 is reciprocated over a certain distance by turning the ring 20 with regard to the measuring device 8, this pivotal movement being transmitted via the magnet 18 to the measuring roller 15. The measuring roller 15 is correspondingly reciprocated in front of the measuring device until in a position with minimum spacing from the measuring device 8. A measurement is made in this position of minimum spacing stored and indicated, and this is the wall thickness of the tube 1 at the measuring position. The measuring device 8 together with the magnet 19 may be moved by turning the carrier 21 together with the ring 20 into an alternative measuring position, which for example is offset by 90° relative to the measuring position shown. The magnet 18 and the measuring roller 15 will follow to this new measuring position. Measurement is now made here, whereafter the whole device is displaced into a further measuring position until finally it arrives again in the first measuring position. In this manner measurements may be effected at short intervals at several positions with a single measuring device, and hence the uniformity and amount of the wall thickness can be ascertained.

Figure 6:
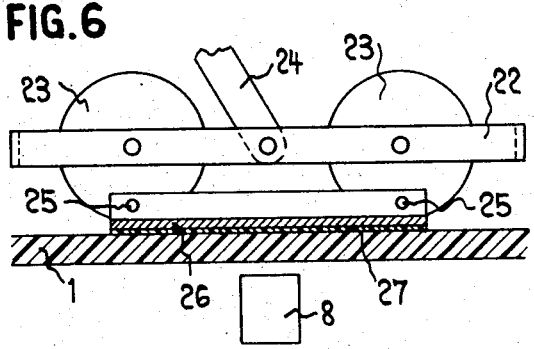
FIG. 6 and 7 show further embodiments in section.
Figure 7:
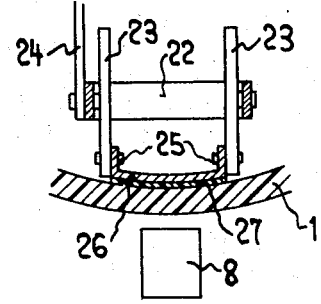

FIGS. 6 and 7 show a further embodiment. In the tube 1 there is a carriage having four plastics material wheels 23 mounted so as to be rotatable in a frame 22. The frame 22 is retained in contact with the tube wall under suitable pressure by means of a resilient suspension having a guide rod 24. All four wheels 23 are coupled by means of pins 25 to a curved plate 26. The plate 26 is provided on the outside with a plastics material coating 27, which permits a sliding engagement with the internal wall surface of the tube.

During measurement the wheels 23 are in rolling engagement over the inside wall surface of the tube, and the curved plate 26 executes cycloidal movement relative to the tube wall or to the measuring device 8. When the plate reaches the tube wall the plate becomes supported thereon and temporarily lifts the wheels 23 off the tube wall. By this, not only is the plate given a definite position relative to the tube wall or the measuring device 8, but the plate does not slide along the wall as long as it is in contact with the wall, but is carried along and continues to rotate the wheels 23 until the latter again arrive on the tube wall. Hence no sliding friction occurs, and yet the minimum spacing of the plate 26 is clearly defined by the tube wall thickness. This minimum spacing measurement is stored and indicated, and used as measure of the wall thickness of the tube at the measuring position. The radius of curvature of the plate 26 or its plastics material coating 27 may be somewhat less than the inside radius of the tube 1, so that the plate, in the measuring position, contacts the inside surface of the tube along a line.

The whole measuring device shown in FIGS. 6 and 7 may be moved into various positions and the wall thickness measured successively at various positions, or alternatively several such measuring devices may be provided. It would, for example, be possible to arrange the wheels 23 somewhat askew so that they move along high pitch helical lines along the inside wall surface of the tube and hence cause a slow rotation of the carriage along the circumference of the tube. In this case it may be preferred, as shown in FIG. 2, to arrange several measuring devices 8 around the circumference of the tube on which the plate 26 of the carriage successively acts during its rotation along the circumference of the tube.

Figure 8:
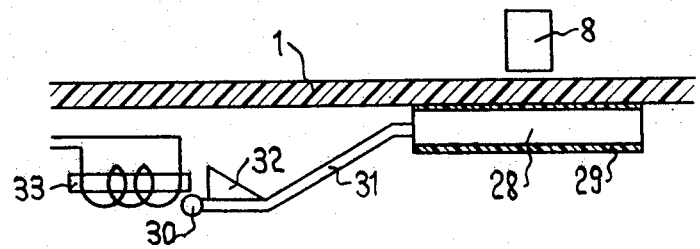
FIG. 8 and 9 show further embodiments in longitudinal section.

FIG. 8 shows a further possible embodiment, in which a measuring roller with a metal core 28 and plastics material coating 29 is mounted on an arm 31 pivoted about a pivot 30. By means of an electro-magnet 33 acting on an armature 32 the roller 28, 29 is constantly pressed against the wall of the tube when a measurement is to be effected. This is to reduce any pressure marks on the inside wall surface to a minimum. In this case several measuring rollers 28, 29 spread around the tube circumference may be provided and pressed thereagainst when an existing measuring device 8 is within its range. During measurement the measuring device 8 may be reciprocated with regard to the measuring roller 28, 29 over a small distance so that in all cases the minimum spacing between measuring device and measuring roller 28, 29 is measured.

Figure 9:
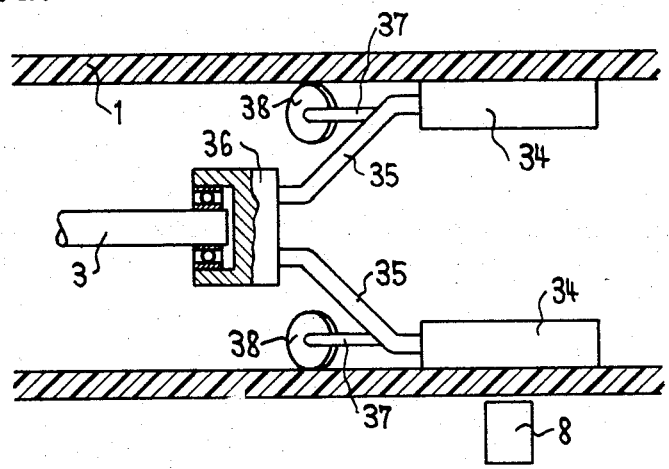

FIG. 9 shows a further possible embodiment. Two measuring rollers 34, which may be made as shown in FIG. 8, are located in diametrically opposite positions in the tube 1. They are connected by arms 35 to the rotor 36, which is mounted so as to be rotatable on the carrier 3 connected to the mandrel. Axles 37 on which the wheels 38 contacting the inside wall surface of the tube are mounted, are connected to the two arms 35. The axles of the wheels 38 are at an angle relative to the longitudinal axis of the tube 1, so that the wheels 38 pass in rolling engagement over helical lines on the inside surface of the tube and hence cause a rotation of the system including the arms 35 and the rotor 36. The rollers 34 therefore roll past at least one measuring device 8, so that in the manner described the tube thickness at minimum spacing of a roller 34 from the measuring device 8 can be ascertained and indicated. One measuring device 8 may be set into various measuring positions along the circumference of the tube, or several measuring devices may be provided as shown in FIG. 2.

Figure 10:
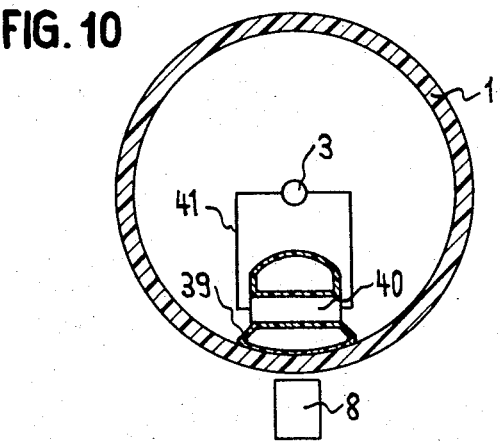
FIG. 10 shows a further embodiment in cross-section.

FIG. 10 shows an embodiment in which a tyre-like measuring article 39, metallised inside and outside, is in rolling engagement with the inside surface of the tube 1. The tyre is mounted on a tyre rim. The tyre rim is suspended by means of a spring-loaded stirrup 41 on the carrier 3.

During measurement the tyre-like measuring article 39 is in rolling engagement over the inside surface, sufficiently large area being supported in close contact with the inside surface of the tube 1. The measuring device 8 is affected by the part of the article 39 abutting the inside surface of the tube 1 and hence measures the wall thickness of the tube at the measuring position. Again it is possible to arrange several measuring systems in accordance with FIG. 10, spread over the tube circumference, or a measuring system is rotated along the circumference and caused to measure at several points, or the article 39 is mounted somewhat askew, such that it moves along a helical line on the tube and successively influences one or more measuring devices 8 at various points. Since the metallising of the tyre-like article 39 may be quite thin, it is preferable to use a high frequency measuring current.

Alternative embodiments are of course possible, such as using elements of one embodiment in conjunction with elements of other embodiments. In all cases it is essential that the spacing of the metallic article from the inside surface of the tube is clearly defined such as by a layer of plastics material or the like located between it and the tube, so that this spacing may assume an optional value between a minimum and a maximum for accurate measurement. It is also advisable in most cases to provide a relative movement between the article being measured and a measuring device such that a clearly defined minimum spacing occurs between these parts. Here the ascertained dimension may be amended to give the exact wall thickness of the tube in question.

Figure 11:
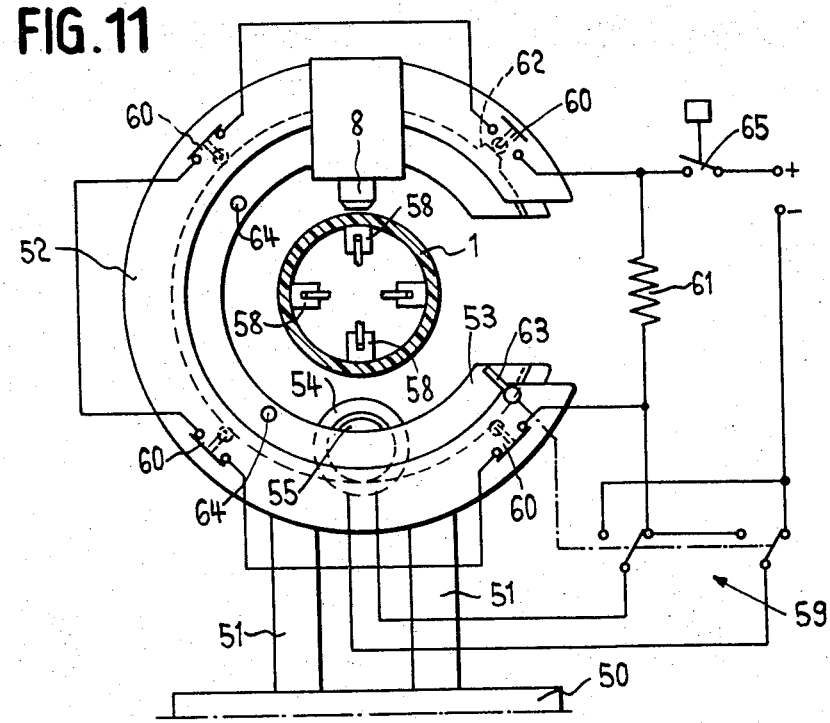
FIGS. 11 and 12 show a last embodiment.
Figure 12:
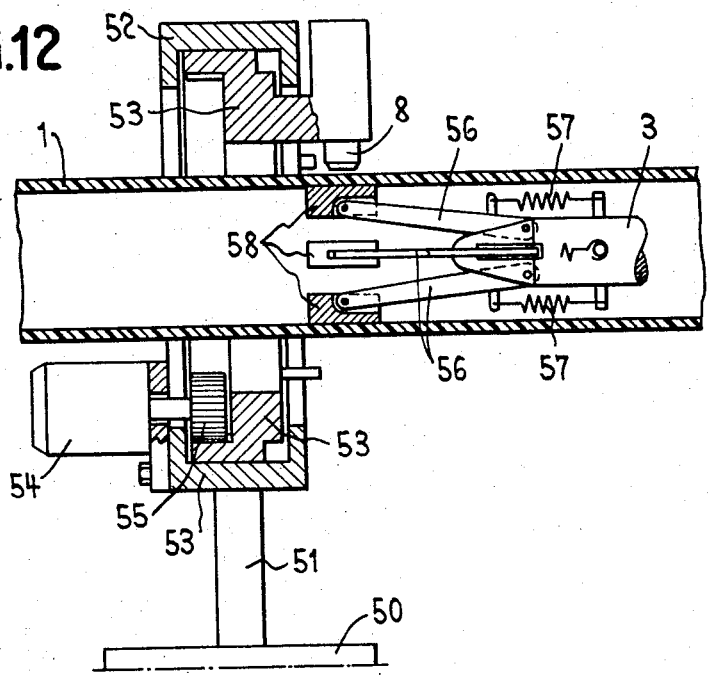

FIGS. 11 and 12 show more details not only of a measuring device but also of a circuit for control of the motion of the measuring head. Corresponding parts are designated with the same reference numerals as in the foregoing embodiments.

The outer portions of the measuring apparatus are mounted on a casing 50 of which the upper end only is shown and which may be displaceable on wheels. By means of two struts 51 the casing 50 carries an open ring 52 in which an inner open or slotted ring 53 is rotatably mounted. A reversible direct-current motor 54 with a reduction gear not shown in the drawing, is fixed to the outer ring 52 for driving the inner ring 53 by means of a pinion 55 meshing with an internal toothing of ring 53. The measuring head 8 is fixed on the inner rotatable ring 53, and is maintained at a predetermined distance from the tube 1 during measurement, for instance by means of a pneumatic servo control of the type described in copending U.S. Pat. application Ser. No. 316,402.

Inside the tube 1 four arms 56 are swingably mounted on carrier 3 which is fixed to the mandrel 2 of the extruder nozzle as explained above, arms 56 being urged outwardly towards the wall of tube 1 by pull springs 57. The free outer ends of arms 57 are pivotably connected to pads 58 of electrically conducting material. Therefore, these pads contact the inside surface of the tube leaving the extruder and they may easily adapt their position to any unevenness of the tube surface.

Motor 54 may be energized through a double pole reversing switch 59 and alternatively through four micro switches 60 connected in series or through a resistor 61. The micro switches 60 are spaced by 90° from each other along the circumference of the ring 52 and fixed to the same. They are controlled by means of a cam 62 of the inner ring 53. The micro switches are usually closed and may be opened if the cam 62 is below and supports the actuating rod of a micro switch as shown for the switch illustrated in the upper right portion of FIG. 11. The reversing switch has a schematically illustrated actuating lever 63 by which the switch may be controlled by two pins 64 fixed on the inner ring 53 in positions staggered by 90°. The circuit may be energized or cut off by means of a main switch 65.

FIGS. 11 and 12 show an operating position of the device, in which the measuring head 8 faces one of pads 58 and the measuring feeler is influenced by this pad. Therefore, the thickness of tube 1 is being measured at the upper side of the same. As mentioned above, the upper right micro switch is maintained in open position by cam 62. The series circuit including all micro switches 60 is thus broken and motor 54 is energized through resistor 61 and thus rotates at a reduced speed. Therefore, the measuring head 8 is circumferentially moved over the pad 58 at a relatively low speed. The extremum value measured during this passage of the measuring head over pad 58 is read and/or registered and is considered as being determining for the wall thickness at the upper generating line of the tube. When the measuring head leaves its upper measuring range, the cam 62 leaves the actuating rod of the upper right-hand micro switch whereby this switch is closed. The resistor 61 is now bridged by all closed micro switches 60 and motor 54 is energized with a higher potential and rotates the ring 53 with the measuring head 8 into the next measuring position at an increased speed. When approaching the next measuring position, cam 62 again engages the actuating rod of one of the micro switches 60 and opens this switch, whereby slow motion of the measuring head 8 through the next measuring range is effected. When reaching each one of the extreme measuring positions or shortly after, the one of control pins 64 engages the actuating lever 63 of reversing switch 59 and changes this switch over. Thereby the motor 59 is reversed and the inner ring 53 is now rotated in opposite direction and the measuring head 8 scans the four measuring positions or measuring ranges in opposite order.

Since both rings 52 and 53 are open or slotted the measuring apparatus may be shifted laterally onto or from the tube 1.

The driving circuit shown in FIGS. 11 and 12 may of course be used in other embodiments, particularly in the apparatus shown in FIG. 5 where the ring 20 with magnet 19 may be driven in the same manner as the ring 53 shown in FIGS. 11 and 12.

Instead of the metallic objects provided inside the tube 1, other suitable objects may be used. As an example, a bundle or brush of wires may be provided of which the wires are elastically applied against the inner surface of the tube in a practically uniform distribution, such that a substantially uniform layer of electrically conducting material is formed at the inside of the tube. Instead of the inflatable tire-like object 39 shown in FIG. 10 an inflated ball or balloon coated with metal strips or a continuous metallisation may be provided, the surface of this ball or balloon being uniformly applied against the inside of the tube.

What we claim is:

1. A method of measuring the wall thickness of a tube of non-conductive material leaving an extruder nozzle, including the steps of locating an electrically conductive article inside the tube, approaching to and maintaining a measuring device at a predetermined distance from the outer surface of the tube for measurement of the distance between said article and said measuring device, providing means for producing a relative movement between said measuring device and the article such that the distance between them passes through a minimum with said article in a defined position relatively to the inner surface of the tube, detecting the value measured by said measuring device at this minimum, said value being a measure for the tube thickness where said article is located within the tube during detection of said value.

2. A method according to claim 1, wherein said article is held in contact with the inner surface of the tube along a line and the relative movement produced is such that the measuring device intersects the line of contact of the article on the inner surface of the tube.

3. A method according to claim 1, in which the measuring device is maintained near the outer surface of the tube without touching the same.

4. A method according to claim 1, wherein the article has a conductive surface which is placed against the inside surface of the tube.

5. A method according to claim 1, wherein several articles are spread around the circumference of the tube.

6. Apparatus for measuring the wall thickness of a tube of electrically insulating material leaving an extruder nozzle, comprising an electrically conducting article anchored on a mandrel forming part of an extruder nozzle, and held inside the tube being extruded, a measuring device set at a predetermined distance from the outer surface of the tube to measure the spacing between the device and the article, and means for producing relative displacement between said measuring device and said article thereby varying the distance between said article and said measuring device such that said distance becomes minimum with said article in a defined position relatively to the inner surface of the tube, said minimum distance measured by said measuring device being a measure for the thickness of the tube wall.

7. An apparatus according to claim 6, wherein said article is a flat metal spring resiliently abutting the inside wall of the tube.

8. Apparatus according to claim 7, wherein the flat spring is connected to a shaft which moves it over the circumference of the tube.

9. Apparatus according to claim 6, wherein the article is formed as a cask-shaped roller which rests against the inside surface of the tube and is rotatable about an axle at right angles to the tube axis, wherein the roller is made of non-conducting material and has a conductive part eccentrically inserted therein.

10. Apparatus according to claim 6, including a wheeled carriage resting with its wheels against the inside surface of the tube, the wheels of the carriage being coupled with a conductive plate forming said article which executes a cycloidal movement in the tube when said wheels roll off on the tube wall, including a point where it is at a minimum distance from the inside surface of the tube.

11. Apparatus according to claim 10, wherein the plate is curved towards the wall of the tube.

12. Apparatus according to claim 6, including at least one article having a cylindrical surface abutting along a longitudinal line with the inside surface of the tube.

13. Apparatus according to claim 12, wherein the article is secured to radially elastically resilient arms.

14. Apparatus according to claim 12, wherein the article is held in position by magnets located outside the tube.

15. Apparatus according to claim 6, wherein the article is a tyre-like roller metallised internally, the roller being held against the inside surface of the tube and in rolling engagement therewith.

16. Apparatus according to claim 6, wherein at least one wheel contacting the inside wall surface of the tube is mounted on said article and has its axis inclined relatively to the axis of the tube so as to produce a rotary movement of the article with respect to the circumference of the tube.

17. Apparatus according to claim 6, wherein an electromagnet is provided for temporarily holding the article against the inside surface of the tube.

18. Apparatus according to claim 6, wherein a number of electrically conducting articles are distributed along the circumference at the inside of the tube, means being provided for imparting a reciprocating rotating motion to a mesuring device for scanning over all said articles.

19. Apparatus according to claim 18, comprising switch means for slowing down the speed of the measuring device within reach of each of said articles during its scanning motion.

20. A method according to claim 1, wherein several measuring devices are spread around the circumference of the tube.

21. A method according to claim 1, wherein one measuring device is moved successively to several measuring positions along the circumference of the tube.

* * * * *